United States Patent Office 3,726,895
Patented Apr. 10, 1973

3,726,895
DIGLYCIDYL DERIVATIVES OF COMPOUNDS CONTAINING TWO N-HETEROCYCLIC RINGS
Juergen Habermeier, Allschwil, Hans Batzer, Arlesheim, and Daniel Porret, Binningen, Switzerland, assignors to Ciba-Geigy Limited, Basel, Switzerland
No Drawing. Filed Oct. 13, 1970, Ser. No. 80,493
Claims priority, application Switzerland, Nov. 18, 1969, 17,105/69
Int. Cl. C07d *49/32*
U.S. Cl. 260—309.5                                    6 Claims

ABSTRACT OF THE DISCLOSURE

New diglycidyl ethers of binuclear, five-membered or six-membered, unsubstituted or substituted N-heterocyclic compounds containing styrene oxide as an adduct, which possess two N atoms per heterocyclic ring, obtained by reaction of binuclear, five-membered or six-membered, unsubstituted or substituted N-heterocyclic compounds, such as bis-(hydantoin) or bis-(dihydrouracil) compounds, for example 1,1'-methylene-bis-(5,5-dimethylhydantoin), bis-(5,5-dimethylhydantoinyl-3)-methane or 1,1'-methylene-bis-(5,6-dihydrouracil), with styrene oxide to give the appropriate monohydroxy or dihydroxy compounds, and subsequent glycidylation of the OH groups or of the OH group and NH group to give the corresponding glycidyl ethers.

The subject of the present invention are new diglycidyl ethers of general formula:

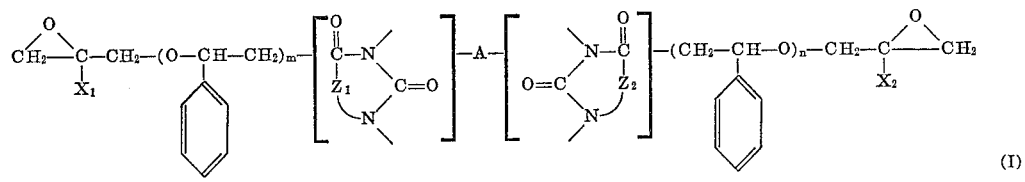

(I)

wherein $Z_1$ and $Z_2$ independently of one another each denote a nitrogen-free divalent radical which is necessary to complete a five-membered or six-membered, unsubstituted or substituted heterocyclic ring, A represents a divalent aliphatic, cycloaliphatic or araliphatic radical, and in particular preferably represents an alkylene radical or an alkylene radical which is interrupted by oxygen atoms, $X_1$ and $X_2$ each denote a hydrogen atom or a methyl group and $m$ and $n$ each represent an integer having a value of 0 to 30, preferably of 0 to 4, with the sum of $m$ and $n$ having to be at least 1.

The radical Z in the Formula I preferably only consists of carbon and hydrogen or of carbon, hydrogen and oxygen. It can for example be a radical of formulae

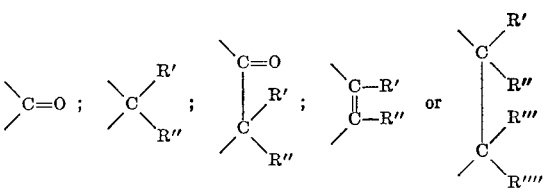

wherein R', R", R''' and R'''' independently of one another each can denote a hydrogen atom or, for example, an alkyl radical, an alkenyl radical, a cycloalkyl radical or an optionally substituted phenyl radical.

The new diglycidyl ethers of Formula I can be manufactured if compounds of general formula

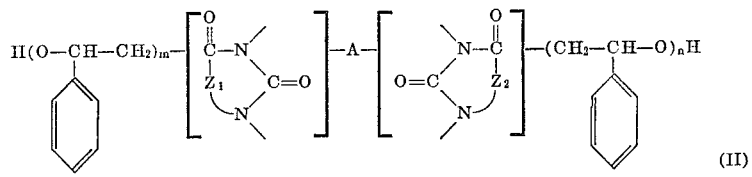

(II)

wherein $Z_1$, $Z_2$, A, $m$ and $n$ have the same meaning as in Formula I, are reacted in one stage or several stages, in a manner which is in itself known, with an epihalogenohydrin or β-methylepihalogenohydrin, such as for example epichlorhydrin, β-methylepichlorhydrin or epibromhydrin.

In the single-stage process, the reaction of epihalogenohydrin with a compound of Formula II takes place in the presence of alkali, with sodium hydroxide or potassium hydroxide being preferably used. In this single-stage process, the epichlorhydrin which is reacted according to the process can be wholly or partially replaced by dichlorhydrin, which under the process conditions and on appropriate addition of alkali is transiently converted to epichlorhydrin and then reacted as such with the monoalcohol or dialcohol of Formula II. In the two-stage process which is preferably used, the compound of Formula II undergoes an addition reaction with an epihalogenohydrin in the presence of acid or basic catalysts to give the halogenohydrin ether and thereafter the latter is dehydrohalogenated in a second stage by means of alkalis, such as potassium hydroxide or sodium hydroxide, to give the glycidyl ether.

Suitable acid catalysts for the two-stage processes are especially Lewis acids, such as for example AlCl$_3$, SbCl$_5$, SnCl$_4$, FeCl$_3$, ZnCl$_2$, BF$_3$ and their complexes with organic compounds.

The reaction can also be accelerated by addition of other suitable catalysts, for example alkali hydroxides, such as sodium hydroxide, alkali halides, such as lithium chloride, potassium chloride, sodium chloride, bromide and fluoride.

Preferably, the new glycidyl ethers according to the invention, of Formula I, are manufactured by reacting an epihalogenohydrin, preferably epichlorohydrin, with a compound of Formula II in the presence of a basic catalyst, such as preferably a tertiary amine or a quaternary ammonium base or a quaternary ammonium salt, and treating the resulting product, containing halogenohydrin groups, with agents which split off hydrogen halides.

Suitable basic catalysts for the addition of epichlorohydrin are above all tertiary amines, such as triethylamine, tri-n-propylamine, benzyldimethylamine, N,N-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; further, ion exchange resins with tertiary or quaternary amino groups, and also trialkylhydrazonium salts, such as trimethylhydrazonium iodide.

Further suitable catalysts are also low molecular thioethers and sulphonium salts, or compounds which can be converted into thioethers or sulphonium compounds with the epihalogenohydrins, such as hydrogen sulphide, sodium sulphide or mercaptans.

As such thioethers or sulphonium salts there may be mentioned: diethyl-sulphide, β-hydroxyethyl-ethyl-sulphide, β-hydroxypropyl-ethyl-sulphide, ω-hydroxy-tetramethylene-ethyl-sulphide, thiodiglycol, monom-β-cyanoethyl-thioglycol-ether, dibenzyl-sulphide, benzyl-ethyl-sulphide, benzyl-butyl-sulphide, trimethylsulphonium iodide, tris(β-hydroxy-ethyl)sulphonium chloride, dibenzylmethylsulphonium bromide, 2,3-epoxypropylmethylethylsulphonium iodide, dodecyl-methylsulphide and dithiane.

Strong alkalis, such as anhydrous sodium hydroxide or aqueous sodium hydroxide solution, are as a rule used for the dehydrohalogenation; however, other alkaline reagents, such as potassium hydroxide, barium hydroxide, calcium hydroxide, sodium carbonate or potassium carbonate can also be employed.

The dehydrohalogenation can in turn be carried out in several stages. Thus it is possbile first to carry out a treatment with solid sodium hydroxide or potassium hydroxide at elevated temperature and, after distilling off the excess epihalogenohydrin, to heat the residue, in an inert solvent, with an excess of concentrated alkali hydroxide solution, for example 50% strength sodium hydroxide solution.

Possible epihalogenohydrins are epibromohydrin β-methyl-epichlorohydrin or above all epichlorohydrin. Good yields are obtained if an excess of epichlorohydrin, and in particular preferably 4 to 40 mols of epichlorohydrin, is used per hydroxyl or NH group. During the first reaction stage, before the addition of alkali, a partial epoxidation of the bis-chlorohydrin ether of a compound of Formula II already occurs. The epichlorohydrin, which serves as a hydrogen chloride acceptor, is at the same time partially converted into glycerine-dichlorohydrin. This is regenerated in the treatment with alkali, so as to give epichlorohydrin again.

The monoalcohols and dialcohols of general Formula II have not hitherto been described in the literature and are obtained in a known manner by reacting binuclear N-heterocyclic compounds of general formula

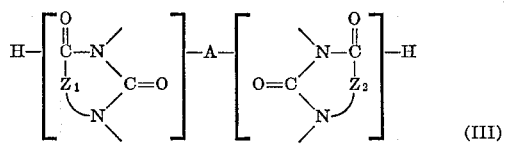

wherein $Z_1$, $Z_2$ and $A$ have the same meaning as in Formula I, with styrene oxide in the presence of a suitable catalyst.

The addition of styrene oxide to one or both NH groups of the binuclear N-heterocyclic compounds of Formula III can be carried out both in the presence of acid catalysts and of alkali catalysts, with a slight excess over the equivalent amount of the styrene oxide being employed per equivalent of NH group of the binuclear N-heterocyclic compound of Formula III.

Preferably, however, alkaline catalysts such as tetraethylammonium chloride or tertiary amines are used in the manufacture of monoalcohols and dialcohols of Formula II, in which the sum of $m$ and $n$ is 1 or 2. However, alkali halides, such as lithium chloride or sodium chloride, can also be successfully used for this addition reaction; it also takes place without catalysts.

When manufacturing dialcohols of Formula II in which the sum of $m$ and $n$ is greater than 2, it is preferable to start from the simple dialcohols of Formula II in which $m$ and n are each 1, with further styrene oxide being added to both OH groups of this compound in the presence of acid catalysts.

The binuclear N-heterocyclic compounds of Formula III used for the manufacture of the new styrene oxide addition products of Formula II are above all bis-(hydantoin) compounds or bis-(dihydrouracil) compounds in which the two N-heterocyclic rings are linked to one another via an alkylene bridge, for example, a methylene group which is bonded to one endocyclic nitrogen atom of each of the heterocyclic rings in question.

A first class of such bis-(hydantoin) compounds corresponds to the general formula

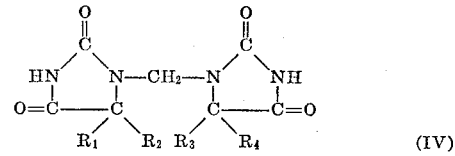

wherein $R_1$, $R_2$, $R_3$ and $R_4$ each denote a hydrogen atom or a lower alkyl radical with 1 to 4 carbon atoms, or wherein $R_1$ and $R_2$ or $R_3$ and $R_4$ together form a tetramethylene or pentamethylene radical.

1,1' - methylene - bis-(5,5-dimethyl-hydantoin), 1,1'-methylene - bis - (5 - methyl-5-ethyl-hydantoin), 1,1'-methylene - bis - (5-propyl-hydantoin), 1,1'-methylene-bis-(5-isopropyl-hydantoin) may for example be mentioned.

A further class of such bis-(hydantoin) compounds corresponds to the general formula

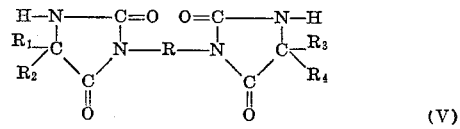

wherein R is an aliphatic, cycloaliphatic or araliphatic radical, especially an alkyl radical, or an alkylene radical which is interrupted by oxygen atoms, and R, $R_2$, $R_3$ and $R_4$ each denote a hydrogen atom or a lower alkyl radical with 1 to 4 carbon atoms, or wherein $R_1$ and $R_2$, or $R_3$ and $R_4$, together form a tetramethylene or pentamethylene radical. Bis - (5,5 - dimethyl-hydantoinyl-3)-methane, 1,2 - bis - (5', 5'-dimethyl-hydantoinyl-3')-ethane, 1,4-bis-(5',5' - dimethyl - hydantoinyl-3')-butane, 1,6-bis-(5',5'- dimethyl-hydantoinyl-3')-hexane, 1,12-bis-(5',5-dimethyl-hydantoinyl-3')-dodecane and β,β'-bis-(5',5'-dimethyl-hydantoinyl-3')-diethyl-ether may be mentioned.

A preferentially employed class of bis-(dihydrouracil) compounds corresponds to the general formula

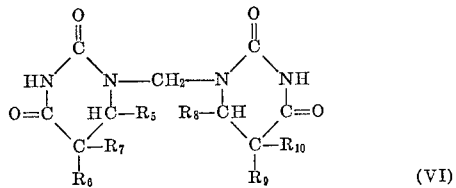

(VI)

wherein $R_5$, $R_6$, $R_7$, $R_8$, $R_9$ and $R_{10}$ independently of one another each denote a hydrogen atom or a lower alkyl radical with 1 to 4 carbon atoms.

1,1'-methylene-bis-(5,6-dihydrouracil), 1,1'-methylene-bis-(6-methyl-5,6-dihydrouracil) and 1,1'-methylene-bis-(5,5-dimethyl-5,6-dihydrouracil) may be mentioned.

The new diglycidyl ethers according to the invention, of Formula I, react with the customary curing agents for polyepoxide compounds and can therefore be crosslinked or cured by addition of such curing agents, analogously to other polyfunctional epoxide compounds or epoxide resins. Possible curing agents of this kind are basic or acid compounds.

As suitable curing agents there may for example be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis-(4-amino-3-methyl-cyclohexyl)-methane, 3,5,5 - trimethyl-3-(aminomethyl)-cyclohexylamine ("isophoronediamine"), Mannich bases, such as 2,4,6 - tris - (dimethylaminomethyl)-phenol; m-phenylenediamine, p-phenylenediamine, bis - (4 - aminophenyl)-methane, bis-(4 - aminophenyl)-sulphone, m-xylylenediamine; N-(2-aminoethyl)-piperazine; adducts of acrylonitrile or of monoepoxides, such as ethylene oxide or propylene oxide, to polyalkylenepolyamines, such as diethylenetriamine or triethylenetetramine; adducts of polyamines, such as diethylenetriamine or triethylenetetramine, in excess, and polyepoxides, such as diomethane-polyglycidyl-ethers; ketimines, for example of acetone or methyl ethyl ketone and bis(p-aminophenyl)-methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid (Versamid); polymeric polysulphides (Thiokol); dicyandiamide, and aniline-formaldehyde resins; polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (-methylnadic anhydride), 3,4,5,6,7,7-hexachloro-3,6-endomethylene-$\Delta^4$-tetrahydrophthalic anhydride, succinic anhydride, adipic anhydride, azelaic anhydride, sebacic anhydride, maleic anhydride, dodecenyl-succinic anhydride, pyromellitic dianhydride or mixtures of such anhydrides.

Curing accelerators can furthermore be employed in the curing reaction; when using polyamides, dicyandiamide, polymeric polysulphides or polycarboxylic anhydrides as curing agents, tertiary amines, their salts or quaternary ammonium compounds, for example 2,4,6-tris-(dimethylaminomethyl) - phenol, benzyldimethylamine, 2-ethyl-4-methylimidazole, 4 - amino - pyridine, triamylammonium phenolate, and also alkali metal alcoholates, such as for example sodium hexanetriolate, are for example suitable as accelerators. When curing with amines, monophenols or polyphenols, such as phenol or diomethane, salicylic acid or thiocyanates can for example be used as accelerators.

The term "curing" as used here, denotes the conversion of the above diepoxides into insoluble and infusible, cross-linked products, and in particular as a rule with simultaneous shaping to give mouldings, such as castings, pressings or laminates and the like, or to give sheet materials or films such as coatings, coverings, lacquer films or adhesive bonds.

Depending on the choice of the curing agent, the curing reaction can be carried out at room temperature (18–25° C.) or at elevated temperature (for example 50–180° C.).

The curing can, if desired, also be carried out in 2 stages, by first prematurely stopping the curing reaction or carrying out the first stage at only moderately elevated temperature, whereupon a curable precondensate which is still fusible and soluble (a so-called "B-stage") is obtained from the epoxide component and the curing agent component. Such a precondensate can for example serve for the manufacture of "prepregs," compression moulding compositions or sintering powders.

The subject of the present invention therefore also includes curable mixtures which are suitable for the manufacture of mouldings, including sheet materials or films, and which contain the diglycidyl ethers according to the invention, optionally together with other diepoxide or polyepoxide compounds and also curing agents for epoxide resins, such as polyamines or polycarboxylic acid anhydrides.

The diepoxides according to the invention or their mixtures with other polyepoxide compounds and/or curing agents can furthermore be mixed, in any state before curing, with customary modifiers, such as extenders, fillers and reinforcing agents, pigments, dyestuffs, organic solvents, plasticisers, flow control agents, agents for conferring thixotropy, flameproofing substances or mould release agents.

As extenders, reinforcing agents, fillers and pigments which can be employed in the curable mixtures according to the invention, there may for example be mentioned: coal tar, bitumen, natural synthetic textile fibres, glass fibres, asbestos fibres, boron fibres, carbon fibres, cellulose, polyethylene powder, polypropylene powder; quartz powder; mineral silicates such as mica, asbestos powder or slate powder; kaolin, aluminium oxide trihydrate, chalk powder, gypsum, antimony trioxide, bentones, silica aerogel (Aerosil), lithopone, barytes, titanium dioxide, carbon black, graphite, oxide colours, such as iron oxide, or metal powders, such as aluminium powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate, and also polypropylene glycols can be employed as plasticisers for modifying the curable mixtures.

Silicones, cellulose acetobutyrate, polyvinyl butyral, waxes, stearates and the like (which in part are also employed as mould release agents) can for example be added as flow control agents when employing the curable mixtures, especially in surface protection.

Especially for use in the lacquer field, the diepoxide compounds can furthermore be partially esterified in a known manner with carboxylic acid, such as especially higher unsaturated fatty acids. It is furthermore possible to add other curable synthetic resins, for example phenoplastics or aminoplasts, to such lacquer resin formulations.

The curable mixtures according to the invention can be manufactured in the customary manner with the aid of known mixing equipment (stirrers, kneaders, rolls and the like).

The curable epoxide resin mixtures according to the invention are above all employed in the fields of surface protection, the electrical industry, laminating processes and the building industry. They can be used, in a formulation suited in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, as tool resins, laminating resins, sealing and filling compositions, floor covering compositions and binders for mineral aggregates.

In the examples which follow, unless otherwise stated, parts denote parts by weight and percentage denote percentages by weight. The relationship of parts by volume to parts by weight is as of the millimetre to the gram.

To determine the mechanical and electrical properties of the curable mixtures described in the examples which follow, sheets of 92 x 41 x 12 mm. were manufactured for determining the flexural strength, deflection, impact strength and water absorption. The test specimens (60 x 10 x 4 mm.) for determining the water absorption and for the flexural test and impact test (VSM 77103 and VSM 77105 respectively) were machined from the sheets.

For determining the heat distortion point according to Martens (DIN 53458), test specimens of sizes 120 x 15 x 10 mm. were cast in each case.

For testing the arcing resistance and the tracking resistance (VDE 0303), sheets of sizes 120 x 120 x 4 mm. were cast.

MANUFACTURE OF THE STARTING SUBSTANCES

Example A—1,1'-methylene-bis--[3-(β-hydroxy-β-phenylethyl)-5,5-dimethylhydantoin]

267.5 g. of styrene oxide are added dropwise at 120° C. over the course of 1½ hours, with good stirring, to a solution of 268.25 g. of 1,1'-methylene-bis-(5,5-dimethylhydantoin) [1 mol] and 1.3 g. of lithium chloride in 1.5 litres of dimethylformamide. Thereafter the mixture is stirred for a further 2 hours at 130° C. The clear, light yellow solution is concentrated at 80° C. on a rotary evaporator under a water pump vacuum and is then dried at 85° C./10.1 mm. Hg. 512 g. of a glossy, transparent body (100% of theory) are obtained. For purification, the substance can be recrystallised from an equal amount of ethanol. The yield of pure product (without working up the mother liquor) is 61% of theory. The 1,1'-methylene-bis-[3-(β-hydroxy-β-phenyl-ethyl)-5,5 - dimethylhydantoin] purified in this way melts at 140–142° C.

Elementary analysis shows (percent): Found: N, 11.06; H, 6.39. Calc'd: N, 11.02; H, 6.34.

The infrared spectrum shows, through the absence of absorptions of the N–H grouping and through the presence of the following bands, that the desired substance has been produced: 3450 cm.$^{-1}$ (OH); 1769 cm.$^{-1}$ and 1708 cm.$^{-1}$ (C=O) and 702 cm.$^{-1}$ (aromatic).

Furthermore, the proton-magnetic resonance spectrum (60 Mc HNMR, recorded in CDCl$_3$ at 35° C., with tetramethylsilane (TMS) as the standard) shows that the new compound has the structure given below. Integration shows 32 protons (theory: 32).

12 protons at δ=1.28 (singlet):

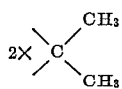

2 protons at δ=3.52–3.70 (multiplet):

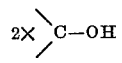

4 protons at δ=3.75–3.90 (quartet):

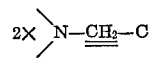

2 protons at δ=4.87 (singlet):

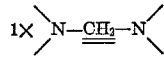

2 protons at δ=4.92–5.05 (multiplet):

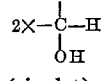

10 protons at δ=7.27 (singlet):

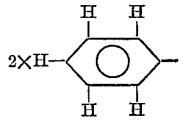

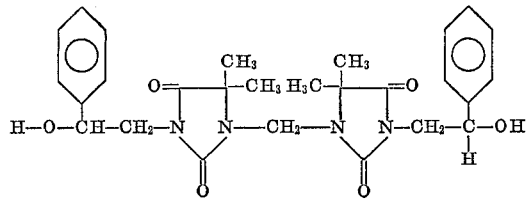

Example B.—1,1'-methylene-bis-[3-(β-hydroxy-β-phenylethyl)-5-isopropylhydantoin]

79.5 g. of styrene oxide (0.66 mol) are added dropwise over the course of 2 hours at 127–131° C., with vigorous stirring, to a mixture of 89 g. of 1,1'-methylene-bis-(5-isopropylhydantoin) (0.3 mol), 500 ml. of dimethylformamide and 0.37 g. of lithium chloride. Thereafter the mixture is stirred for a further 3 hours at 130° C. The pale yellow solution is filtered hot and is subsequently concentrated at 80° C. on a rotary evaporator, under 20 mm. Hg. The residue is now dried to constant weight at 90° C./0.1 mm. Hg. 160.4 g. of a viscous, yellow, clear substance are obtained. This corresponds to 99.3% of theory.

Example C.—Addition of styrene oxide to 1,1'-methylene - bis - [3 - (β - hydroxy - β - phenylethyl) - 5,5-dimethylhydantoin 45.6 g. of the product manufactured according to Example A (0.897 mol) are dissolved in 500 ml. of anhydrous dioxane. 3.5 ml. of a 47% strength boron fluoride-diethyl etherate solution in diethyl ether are then added and the mixture is warmed to 80° C. whilst stirring. 192 g. of styrene oxide (1.6 mols) are now added dropwise over the course of 40 minutes. The reaction becomes exothermic; the temperature of the reaction mixture rises to 84° C. after the heating bath has been removed. Thereafter the reaction mixture is stirred for a further 2 hours at 90° C., adjusted to a pH of 7.0 (initial value: pH=3) with the aid of 30% strength aqueous sodium hydroxide solution, brought to room temperature and filtered. The filtrate is concentrated on a rotary evaporator at 70° C. under a water pump vacuum and dried to constant weight at 85° C./0.1 mm. Hg. 198 g. of a light yellow, viscous substance are obtained. From this yield, the amount of styrene oxide added can be defined as 152.4 g., corresponding to 1.266 mols. Thus approx. 14 molecules of styrene oxide are added per starting molecule.

This is in agreement with combustion analysis. Herein a nitrogen content of 2.4% is found, the theoretically calculated value being 2.5% N. The proton-magnetic resonance spectrum (60 Mc H–NMR, recorded in CDCl$_3$ at 35° C. with tetramethylsilane (TMS) as the standard) also confirms these relationships. If the proton number of the signal of the

groups ($\delta$=1.27) is compared with the proton number of the signal for the aromatic protons, it is found that 16 styrene oxide molecules are present per 1,1'-methylene-bis-(5,5-dimethylhydantoin) molecule. Thus 14 mols of styrene oxide are added per starting molecule. Accordingly the adduct has the following structure:

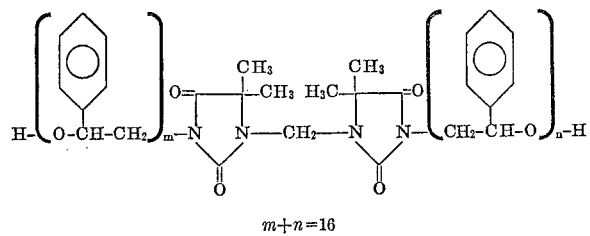

m+n=16

Example D.—2,2'-bis-[1-($\beta$-hydroxy-$\beta$-phenylethyl)-5,5-dimethylhydantoinyl-3]-diethyl ether A solution of 130.8 g. of 2,2'-bis-(5,5-dimethylhydantoinyl-3)-diethyl ether (0.4 mol) in 800 ml. of dimethylformamide is treated with 0.5 g. of lithium chloride and warmed to 140° C. whilst stirring. 106.0 g. of styrene oxide (0.66 mol) are added dropwise at this temperature over the course of 3 hours. Thereafter the mixture is stirred for a further 10 hours at 150° C., cooled to 60° C., filtered and concentrated on a rotary evaporator at 60° C./waterpump vacuum; thereafter the material is dried to constant weight at 85° C./0.2 mm. Hg.

225.8 g. of a light brown, glassy brittle mass are obtained, corresponding to 99.5% of theory. Combustion analysis shows a nitrogen content of 10.00% (theory= 10.00% N). The proton-magnetic resonance spectrum (60 Mc H–NMR, recorded in CDCl$_3$ at 35° C., internal standard: TMS) is also in agreement with the structure given below, and above all the ratio of the protons at $\delta$=1.3 to those of $\delta$=7.3 is 12:10, which also indicates that the reaction takes place quantitatively:

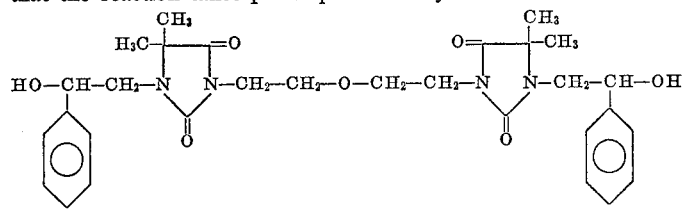

Example E.—1,12-bis-[1'-($\beta$-hydroxy-$\beta$-phenylethyl)-5,5'-dimethylhydantoinyl-3']-dodecane 50.6 g. of 1,12 - bis - (5',5'-dimethylhydantoinyl-3')-dodecane (0.12 mol) together with 500 ml. of dimethylformamide and 0.2 g. of lithium chloride are stirred at 140° C. 31.8 g. of styrene oxide (0.265 mol) are added dropwise over the course of 2 hours. Thereafter the mixture is stirred for a further 12 hours at 148–153° C. Working up is carried out in accordance with Example D. 79.4 g. of a light brown, glassy mass are obtained, corresponding to 99.9% of theory.

MANUFACTURE OF THE GLYCIDYL ETHERS

Example 1.—Manufacture of 1,1'-methylene-bis[3-($\beta$-glycidyloxy-$\beta$-phenylethyl)-5,5-dimethylhydantoin]

A clear solution of 175 g. of 1,1'-methylene-bis-(3-[$\beta$ - hydroxy - $\beta$ - phenylethyl] - 5,5-dimethylhydantoin) [manufactured according to Example A] (0.343 mol) and 1.37 g. of tetraethylammonium chloride in 637 g. of epichlorhydrin (6.9 mols) is stirred for 1½ hours at 80–90° C. 71.5 g. of 50% strength aqueous sodium hydroxide solution (0.894 mol) are then slowly added dropwise at 60° C. over the course of 2 hours, and at the same time water present in the reaction mixture is continuously removed from the batch by azeotropic circulatory distillation, and separated off. After the dropwise addition of the sodium hydroxide solution, the last remnants of water are still removed from the circuit over the course of 10 minutes. The sodium chloride produced in the reaction is then removed by filtration. The filter residue is rinsed with 100 ml. of epichlorohydrin. The combined epichlorhydrin solutions are cooled to room temperature and washed with 200 ml. of water to remove the last remnants of salt. The aqueous phase is separated off and the organic layer is concentrated on a rotary evaporator at 60° C. bath temperature, under a waterpump vacuum. Thereafter the residue is dried to constant weight at 60° C./0.1 mm. Hg.

187.0 g. (corresponding to 88.5% of theory) of a light yellow, viscous, almost solid epoxide resin are obtained, having an epoxide content of 3.21 equivalents/kg. (corresponding to 99.4% of theory). The total chlorine content is 1.5%. The infrared spectrum shows that the absorptions for O—H are absent, and displays ether and epoxide frequencies. The proton-magnetic resonance spectrum (60 Mc H—NMR, recorded in CDCl$_3$) is also in agreement with the structure. The epoxide content is found to be 95% of theory from the integration ratio of the signals for the

protons ($\delta$=2.58–2.83) to that of the C—CH$_3$ protons ($\delta$=1.33), this being in agreement with the value obtained by HClO$_4$ titration in glacial acetic acid.

Accordingly the new diglycidyl ether has the following structure:

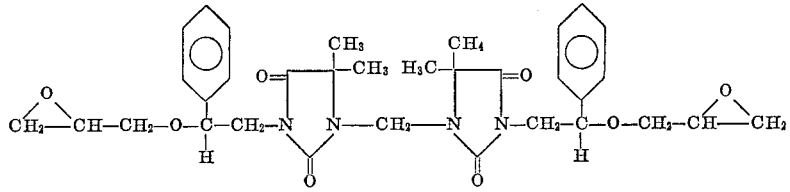

Example 2.—1,1'-methylene-bis-(3-[$\beta$-($\beta$'-methyl)glycidyloxy-$\beta$-phenylethyl]-5,5-dimethylhydantoin)

A mixture of 101.6 g. of the 1,1'-methylene-bis-(3-[$\beta$-hydroxy - $\beta$ - phenylethyl] - 5,5 - dimethylhydantoin) manufactured according to Example A (0.2 mol), 427 g. of $\beta$-methylepichlorhydrin and 1.0 g. of tetraethylammonium chloride is stirred for 2 hours at 90° C. Dehydrohalogenation is then carried out at 60° C. with azeotropic circulatory distillation, as is described in more detail in Example 1. 40.0 g. of 50% strength aqueous sodium hydroxide solution are used for this purpose; 27 ml. of water are separated off over the course of the reaction (theory=27.2 ml.). The reaction mixture is worked up in accordance with Example 1.

124 g. of a pale yellow, clear, highly viscous resin are obtained (theory=124.03 g.). The epoxide content is 3.20 equivalents/kg. ($HClO_4$ titration), corresponding to 99.07% of theory.

The epoxide content can also be estimated from the proton-magnetic resonance spectrum by comparing the integrals of the signals at $\delta=2.43-2.83$

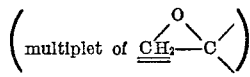

and $\delta=7.32$ (singlet of aromatic protons). This shows 3.23 equivalents/kg., corresponding to 100% of theory.

Example 5—2,2'-bis-[1-(β-glycidyloxy-β-phenylethyl)-5,5-dimethylhydantoinyl-3]-diethyl ether A solution of 235 g. of a 2,2'-bis-[1-(β-hydroxy-β-phenylethyl)-5,5-dimethylhydantoinyl-3]-diethyl ether manufactured according to Example D (0.415 mol) and 2.06 g. of tetraethylammonium chloride in 770 g. of epichlorohydrin is treated in accordance with Example 1. The dehydrohalogenation is carried out with 87.4 g. of 50% strength sodium hydroxide solution. After working up according to Example 1, 278 g. of a viscous epoxide resin (100% of theory) containing 2.93 epoxide equivalents/kg. ($HClO_4$ titration) are obtained, corresponding to 98% of theory. The total chlorine content is 1.5%. The epoxide content is calculated as 97.5% of theory from the H-NMR spectrum (comparison of the integrals of the signals of $\delta=7.37$ (aromatic protons) and $\delta=2.47-2.87$

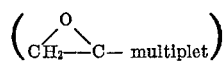

Accordingly, the new resin has the following structure:

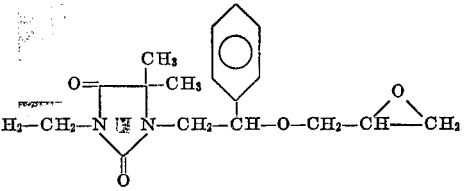

The new β-methylglycidyl compound has the following structure:

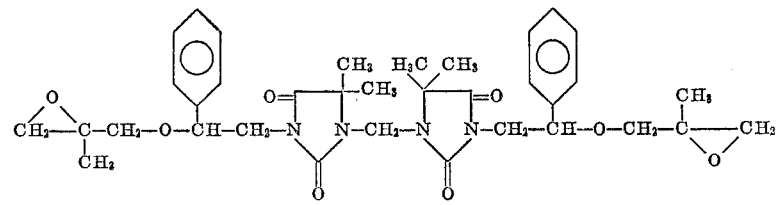

Example 3.—1,1'-methylene-bis-[3(β-glycidyloxy-β-phenylethyl)-5-isopropylhydantoin]

A solution of 160 g. of the 1,1' - methylene-bis-[3(β-hydroxy-β-phenylethyl) - 5 - isopropylhydantoin] manufactured according to Example B (0.298 mol) and 1.7 g. of tetraethylammonium chloride in 553 ml. of epichlorhydrin is treated as described in Example 1. Here, 62.9 g. of 50% strength aqueous sodium hydroxide solution are used for the dehydrohalogenation, and 39.5 ml. of water are separated off during the azeotropic distillation (93.6% of theory).

If the reaction mixture is worked up in accordance with Example 1, 163.4 g. (85% of theory) of an amber-coloured, clear resin of softening point between 35° and 40° C. are obtained. The epoxide content is 2.55 equivalents/kg., corresponding to 82.8% of theory.

Example 4

197 g. of the diol (approx. 0.0905 mol) manufactured according to Example C by addition of styrene oxide to 1,1' - methylene-bis-[3 - (hydroxy-β-phenylethyl) - 5,5-dimethylhydantoin], 838 g. of epichlorohydrin and 0.9 g. of tetraethylammonium chloride are reacted in the manner described in Example 1; the dehydrohalogenation is carried out with 19.55 g. of 50% strength aqueous sodium hydroxide solution.

The mixture is worked up in accordance with Example 1, and 191 g. of the corresponding diglycidyl ether are obtained. The epoxide content is 0.9 equivalent/kg. (theory: approx. 0.87).

Example 6—1,12-bis-[1'-(β-glycidyloxy-β-phenylethyl)-5',5'-dimethylhydantoinyl-3']-dodecane 79.2 g. of the 1,12 - bis - [1' - (β-glycidyloxy-β-phenylethyl)-5',5' - dimethylhydantoinyl-3']-dodecane manufactured according to Example E are reacted according to Example 1 with 223 g. of epichlorhydrin, 0.5 g. of tetraethylammonium chloride and later with 25.3 g. of 50% strength aqueous sodium hydroxide solution. The mixture is worked up as described in Example 1 and 78.3 g. of a viscous, clear transparent, light reddish-brown coloured resin (84.6% of theory) are obtained. The epoxide content is 2.6 equivalents/kg. (theory 2.58), and the total chlorine content is 0.9%.

USE EXAMPLES

Example I 160 parts of the 1,1'-methylene-bis-[3-(β-glycidyloxy-β-phenylethyl)-5,5-dimethylhydantoin] manufactured according to Example 1, containing 3.21 epoxide equivalents per kg., are processed at 60° C. with 72.4 parts of hexahydrophthalic anhydride to give a homogeneous mixture. The mixture is poured into aluminium moulds (13.5 x 4.2 x 2.1 cm.; wall thickness approx. 0.15 mm. for mechanical tests; 13.5 x 4.2 x 0.4 cm. and 13.5 x 13.5 x 0.2 cm., wall thickness 0.4 cm., for electrical tests) prewarmed to 80° C., and cured in 2 hours/80° C.+2 hours/120° C.+15 hours/150° C. The mouldings show the following properties:

Flexural strength (VSM 77103): 8.6 kp./mm.²
Impact strength (VSM 77105): 12.25 cmkp./cm.²
Water absorption (4 days/20° C.): 0.36%
Dielectric loss factor $tg\ \delta$ (DIN 53483) at:
   23° C. $tg\ \delta$: 0.0030
   80° C. $tg\ \delta$: 0.0035
   100° C. $tg\ \delta$: 0.0080
Dielectric constant (DIN 53483) at:
   25° C.: 3.36
   80° C.: 3.48
   100° C.: 3.50
Specific resistance (VDE 0303) at 23° C.: $1.10^{17}\Omega.cm$.

Example II 250 g. of the 2,2'-bis-[1-(β-glycidyloxy-β-phenylethyl)-5,5-dimethylhydantoinyl-3]-diethyl ether manufactured according to Example 5, containing 2.93 epoxide equivalents/kg., together with 95.7 g. of hexahydrophthalic anhydride are processed at 60° C. to give a homogeneous mixture, and 5 g. of a 6% strength solution of the sodium alcoholate of 3-hydroxymethyl-2,4-dihydroxypentane in 3-hydroxymethyl-2,4-dihydroxypentane are then added. This mixture is cured in aluminium moulds according to Example I for 2 hours at 80° C. and 13 hours at 150° C.

The gel time of a 50 g. sample is 29 minutes at 80° C. (Tecam gelation timer).

The mouldings show the following properties:

Cold water absorption (4 days; 20° C.): 0.57%
Flexural strength (VSM): 7.3 kp./mm.²
Tensile strength (VSM): 4.09 kp./mm.²
Arcing resistance according to ASTM 495: No visible track

EXAMPLE III 70 g. of the 1,12-bis-[1'-(β-glycidyloxy-β-phenylethyl)-5',5'-dimethylhydantoinyl-3']-dodecane (sic) manufactured in Example 6, containing 2.6 epoxide equivalents/kg. are mixed with 26.5 g. of hexahydrophthalic anhydride at 70° C. and poured into aluminum moulds according to Example I. Curing is carried out for 2 hours at 80° C. and 3 hours at 120° C. and 15 hours at 150° C. Mouldings having the following properties are obtained:

Flexural strength (VSM 77103): 11.7 kg./mm.²
Deflection (VSM 77103): 6.8 mm.
Impact strength (VSM 77105): 11.5 cmkp./cm.²

What is claimed is:
1. A diglycidyl ether of formula

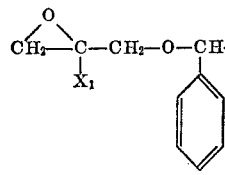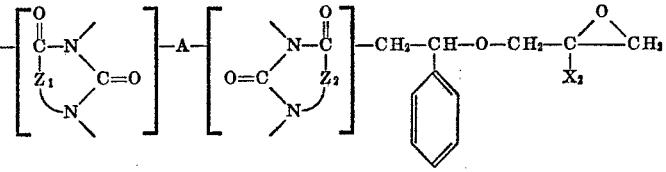

wherein $X_1$ and $X_2$ each represents a member selected from the group consisting of a hydrogen atom and a methyl group, A represents a member selected from the group consisting of $C_{1-12}$-alkylene and $$-CH_2-CH_2-O-CH_2-CH_2-$$

and $Z_1$ and $Z_2$ each represents

wherein R' and R'' each represents a member selected from the group consisting of alkyl and 1 to 5 carbon atoms, alkenyl with 2 to 5 carbon atoms, cyclohexyl, cyclohexenyl and phenyl.

2. A compound as claimed in claim 1 which is 1,1'-methylene-bis-[3-(β-glycidyloxy - β - phenylethyl) - 5,5-dimethylhydantoin].

3. A compound as claimed in claim 1 which is 1,1'-methylene - bis - {3-[β(β'-methyl)-glycidyloxy-β-phenylethyl]-5,5-dimethylhydantoin}.

4. A compound as claimed in claim 1 which is 1,1'-methylene-bis-[3-(β-glycidyloxy - β - phenylethyl)-5-isopropylhydantoin].

5. A compound as claimed in claim 1 which is 2,2'-bis-[1-(β-glycidyloxy - β - phenylethyl) - 5,5 - dimethylhydantoinyl-3]-diethyl ether.

6. A compound as claimed in claim 1 which is 1,12-bis[1'-(β-glycidyloxy - β - phenylethyl) - 5',5' - dimethylhydantoinyl-3']-dodecane.

References Cited
UNITED STATES PATENTS
3,391,097   7/1968   Williamson   260—309.5

HARRY I. MOATZ, Primary Examiner

U.S. Cl. X.R.

260—2 R, 2 EP, 2 EC, 2 EN, 2EA, 13, 17 R, 17.2, 18 R, 23 R, 28, 30.6 R, 31.2 R, 32.8 R, 33.2 R, 33.4 R, 33.6 R, 37 R, 41 R, 47 R, 67, 78 R, 79, 88.7, 257, 260, 824; 117—161 R, 128, 128.4